Sept. 14, 1965          D. KATZ          3,205,930

ANTISKID MEANS FOR AUTOMOTIVE VEHICLES

Filed Dec. 23, 1963

David Katz,
INVENTOR.

United States Patent Office 3,205,930
Patented Sept. 14, 1965

3,205,930
ANTISKID MEANS FOR AUTOMOTIVE VEHICLES
David Katz, 506 W. 35th St., Wilmington 2, Del.
Filed Dec. 23, 1963, Ser. No. 332,456
2 Claims. (Cl. 152—226)

This invention relates to antiskid means for automotive vehicles which travel on wheels having pneumatic tires. It is an object of this invention to provide a novel type of means for increasing the traction of a tire, which means shall be readily applicable to or removable from the tires while the vehicle is stationary. Other objects and achievements of this invention will become apparent as the description proceeds.

It has been recognized for a long time that the tendency of a tire to spin in a bank of snow or to skid on an icy surface is due to the greatly diminished traction between the tire and the surface it moves on when the latter is covered by ice or snow. It has also been the practice for years to wrap cross-linked chains around the tires, to overcome said drop in traction. Such chains, however, when made in one long piece for each tire, require either jacking up the wheel or spreading the ladder-shaped chains lengthwise of the path of each tire, backing up the vehicle over the stretched out ladders, and then, after halting the vehicle, bring the ends of each chain together for fastening around the tire. All of these are arduous operations, not readily achievable by persons in poor health or when dressed in fine clothes.

As a subsequent development, chain-links have appeared on the market, which are applicable individually to the tire in optional number. The task of putting these on is simpler, but still constitutes a very difficult problem where the wheel does not have roomy passages between rim and hub for passing the links or their fastening end bands around the tire and rim and fastening them in place. The recent trend in car manufacture to produce fenders which overhang deeply over the outside of the wheels also adds greatly to the difficulty of fastening chain links to the tires.

Now according to this invention, traction elements are provided in the form of essentially U-shaped snap-on riders or clamps having (a) a relatively flat bottom piece grooved on its outer surface or provided with traction increasing contact material at said surface and (b) elastic prongs or leg elements, preferably curved to fit the shape of the tire sidewalls, whereby the device may readily be sprung onto a tire or removed therefrom.

The annexed drawings illustrate this invention with the aid of a few, preferred embodiments thereof.

FIG. 5 is a side view of a modified form of construction, while

Figure 1:
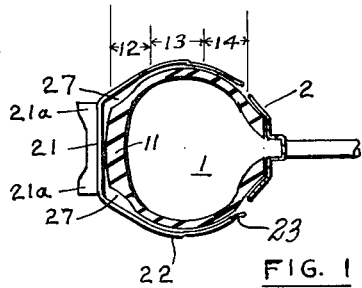
FIG. 1 is a horizontal section through a tire at the level of its axle (e.g. at 9 o'clock of a rear-left tire) having the antiskid device of this invention clamped on to it.

Taking up now the drawings in detail, FIG. 1 shows in section a tire 1, mounted on a rim 2. Tires in general have a characteristic structure in which the following parts can be distinguished: A tread 11, shoulders 12 and sidewalls which terminate in the bead regions. For the purpose of this invention, the region of the sidewalls, where the tire is of greatest width will be designated by the numeral 13 and will sometimes be referred to as the "cheeks" of the tire. The region beyond, from the cheeks to the rim of the wheel, will be designated by numeral 14 and will be referred to as the chin of the tire or the region of receding width, or sometimes simply as the region beyond the cheeks of the tire. The region formally known as the bead region is hidden within the rim of the wheel and is of no concern in this invention.

To achieve the objects of this invention, the clamp must possess two characteristics. It must contact the ground (when the clamp is at the nadir) with a skid-resisting element, and it must possess means for gripping the tire sidewalls firmly, so as not to fall off easily. Accordingly and with particular reference to FIGS. 1 and 2, each clamp of this invention, generally designated as 20, comprises a ground contacting pad 21, which is preferably made of vulcanized rubber, and a U-shaped spring member having prongs or legs 22, made of steel or any other elastic but form-retaining material. (Any metal of high modulus of elasticity in bending will do.)

Figures 2, 3:
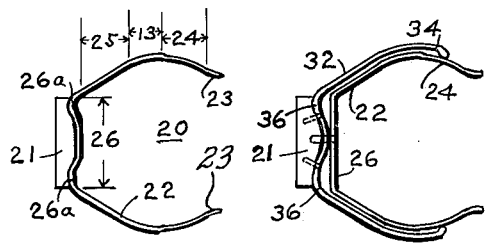
FIGS. 2 and 3 are top views of two modified forms of the antiskid clamp of this invention.
Figure 4:
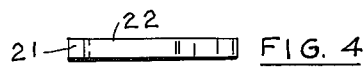
FIG. 4 is a side view of one mode of construction of the novel device, for instance, the one shown in FIG. 1.

Prongs 22 are shaped to follow generally the outline of the tire section, but their tips 23 preferably curve outward to avoid scratching the tire in putting on the device. For reasons which follow, the prongs will be further subdivided for the purpose of reference into regions 24, 13, 25 and 26 (FIG. 2).

Region 24 is the region which extends over the receding width portion of the tire. A good grip here is an absolute necessity; otherwise, the device will fall off and be lost in the course of travel. Consequently, this region is made to follow faithfully the shape of the tire section in the corresponding regions, and the prongs are initially bent to bring the two ends 24 somewhat closer together than the width of the tire in these regions, so that they will press inwards with a certain degree of force after being sprung on the tire.

In the region 25, which covers roughly the shoulder region of the tire, an unduly close fit is to be avoided. As is well known, the tire cross section becomes flattened out at the bottom in the nadir region. If the section be considered as circular at 9, 12 or 3 o'clock, it will assume roughly a loaf shape at 6 o'clock. The regions of the tire from its largest width outward become expanded. If the clamp were initially fitting tight at these regions, it would be compelled to spread out in the nadir position, diminishing the grip of the prongs in region 24. Therefore, region 25 should preferably be made of a shape to leave a slight wedge of air 27 between it and the tire as shown in FIG. 1. In region 13, a mildly pressing fit may be permitted, provided the tightness in region 24 is increased to compensate for same.

It may also be advantageous to make the regions 25 thinner and therefore more yielding in the widthwise dimension of the tire than regions 24.

The region 26 constitutes the bottom of the U-shaped spring, and may be left flat (under certain conditions, as shown for instance in FIG. 1) or it may be made concave outwards (as in FIGS. 2, 3, 6 and 10), but it should not be concave inwards. If the portion 26 were made to follow the contour of the tread, which generally curves slightly around the cross section of the tire, it would flatten out in the nadir position and would again exert a strong tendency to spread out the prongs, especially in the more removed portions thereof (region 24).

FIGS. 1 to 6 show four different embodiments of this invention in which the tendency to spread out the prongs at 24 is overcome by various means. In FIG. 1, the pad 21, assuming that it is made of yielding material (e.g. vulcanized rubber), is shaped to project outward at the edges, as at 21a. When the clamp comes into the nadir position, regions 21a press on the edges of portion 26 of the steel clamp, and the prongs 24 are now given a tendency to bend inwards, whereby their pressure against the tire cheeks and regions beyond is increased.

Figure 6:
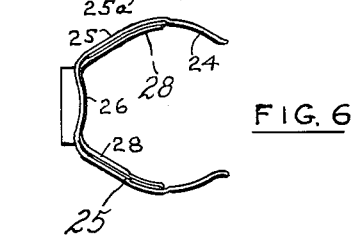
FIG. 6 is a top view of the same modified form.

In FIGS. 2, 3 and 6, the same effect is achieved by giving the metal spring itself a sinusoidal or outwardly concave structure, having bumps 26a at the edges. Pad 21 in these cases may be convex on the inner side, to fit the contour of the outwardly concave bottom of the steel spring (as shown in FIGS. 2, 3, 6 and 10), or it may be made in the shape of a thick-walled tube surrounding said spring bottom, the tube fitting said spring but loosely at the edges, to permit free flexing of the latter when the device is in the nadir position.

In FIG. 3, a modification having two springs is shown. The outer spring 32 has a sinusoidal bottom structure 36 (as in FIG. 2), and its prongs 34 exert inward pressure on prongs 24 of spring 22, which may now have a flat bottom 26. The outer spring, of course, may be made of heavier thickness, and therefore more powerful, than the inner one.

The width of the steel ribbon constituting the U-shaped spring 22, in any of the aforegoing modifications, may be varied at will. The ribbon may be made narrow and of uniform width as in FIG. 4, or it may be made relatively wide, and with an added sideways bulge in the region 24, as in FIGS. 5 and 9.

Figures 7, 8:
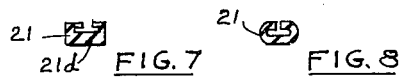
FIGS. 7 and 8 are sections of the ground contacting pad in two optional forms of this invention.

The ground contacting member 21 may be of rectangular cross section as in FIG. 7, or it may be a round or oval tube, as in FIG. 8. It may be affixed to portion 26 of the spring member by riveting, vulcanization or any other convenient manner. On its ground-contacting face 21d, the pad member may be grooved in tire-tread fashion or it may be corrugated lengthwise, to increase traction.

The restriction taught above that portion 25 of the prongs must by-pass without touching (or at least without tightly contacting) the corresponding portions of the tire applies only to those prongs of the spring which are intended to grip the tire in the region beyond its widest diameter. Actually, there is no need for limiting the spring to a single tine on each side. Instead, a plurality of tines may be used, some of which are designed to grip the region beyond the maximum width of the tire (the chin portion) and some to grip mostly the region below said maximum (the shoulder portion). Two embodiments of this modification of the invention are shown in FIGS. 5, 6, 9 and 10.

Figure 5:

In FIGS. 5 and 6, a regular prong 22 is employed to grip the chin of the tire and to by-pass the shoulders. Therefore, it comprises on each side a tight fitting portion 24 and a "full" portion 25 (i.e. one passing loosely over shoulder region) which is split into two legs 25a, leaving an oblong open space therebetween. In front of said open space on the inside of the prong area, a tine 28 rises integrally from the sinusoidal bottom portion 26, but extends not farther than the point of largest width of the tire. When this type of clamp device reaches the nadir of the tire, tines 28 will expand into the spaces between the legs 25a of tine 22, but will not cause the latter to loosen the grip in the chin region of the tire.

Figures 9, 10:
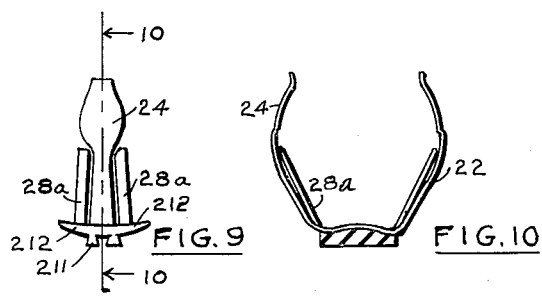
FIG. 9 is a side view of still another modified form, shown in vertical position (i.e. the position it would have at the nadir of the tire, e.g., at 6 o'clock in a left-rear tire).
FIG. 10 is a vertical section of the device along line 10—10 of FIG. 9.

In FIGS. 9 and 10 the same idea is carried out, except that the long tine (gripping the tire chin) is in the middle and there are two short tines 28a on the sides of it. These figures show also a modification in the design of the ground-contacting pad. Instead of having a simple, rectangular or oval cross section in the circumferential direction of the tire, the ground pad here is boat shaped, having slip-resistant ridges 211 in the center and tapering off forward and backward with extensions 212. The result is that by the time one of the ridges 211 hits the snow, ice or ground, the forward tapering end is already partly wedged between the tire and the ground. Consequently, there can be no tendency for the clamp device to be displaced rearwards, no matter how forcefully the snow (or any other obstacle on the ground) pushes back against ridges 211. The rear tapering extension achieves the same function when the vehicle moves in reverse. Furthermore, the tapering ends serve to soften the jolt for the passengers as each traction pad hits the ground.

Figure 11:
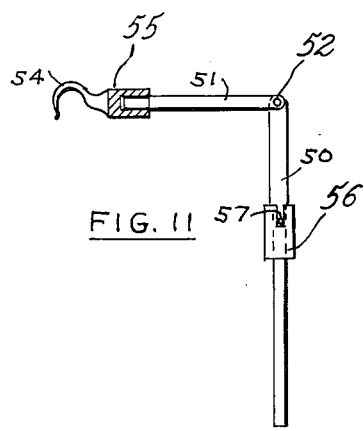
FIG. 11 is a top view (partly in section) of a novel link lever device which may be employed to facilitate the clamping on of the novel appliance onto a tire, although springing on by hand is not excluded from the scope of this invention.

The force required to apply the clamp of this invention to the tire, or to pry it off, will depend on the thickness of its prongs and on the tightness ratio, i.e. the distance between two corresponding points in regions 24 of the prong when relaxed to their distance when they are on the tire. Clamps can be designed and built to enable their being slapped on and pried off by hand. But for stronger springs, a lever device as in FIG. 11 may be employed to assist in putting on the edvice. Rod 51 is hinged on at 52 to the end of a lever 50. Hook member 54 is mounted, through swivelling block 55, on the other end of rod 51 and may be hooked across the axle of the automobile. By properly turning the swivel 55, and by turning lever 50 around the hinge 52 through 180° if necessary, the device may be made to serve a left tire or a right tire, and the lever may be brought out in front of the tire or to the rear of it.

By properly supporting and swinging lever 50 in a horizontal plane, its thickened portion (or removable pad) 56 can be made to bear against the pad portion of the novel clamp device (which is held in a horizontal position against the 3 o'clock or 9 o'clock point of the tire) and to drive it in. Sufficient traction having thus been provided to move the vehicle a few feet, the motor is started and the vehicle is moved until one of the clamps already applied reaches its nadir position. The vehicle is then stopped, and two more clamps may in similar manner be applied against the 3 o'clock and 9 o'clock positions of each tire.

Figure 12:
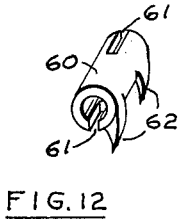
FIG. 12 is a perspective view of a spur-bearing sleeve which can be slipped on the lever arm of the device in FIG. 11, whereby to obtain an instrument for facile removal of the novel clamp device from the tire.

For removing the clamps, a sleeve 60 as in FIG. 12 may be slipped over lever 50 until its notch 61 comes to rest against a protruding pin 57 in lever 50 or pad 56. By turning sleeve 60 end for end, and then again on its axis until the one or the other of notches 61 are locked into pin 57, the spurs 62 on the sleeve may be brought into position above or below any clamp, either in front or the rear of one of the tires, and by swinging the lever now in a vertical plane, the spurs may be dug into the space between spring-bottom portion 26 and the tread or shoulders of the tire, whereupon a simple jerk of the lever will pry off the clamp.

Figure 13:
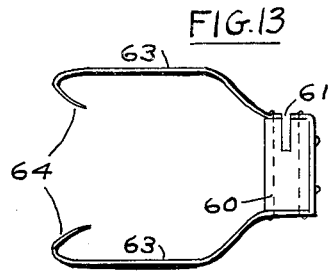
FIGS. 13 and 14 are a top view and side view, respectively, of a modified form of a sleeve for achieving removal of the clamp.
Figure 14:
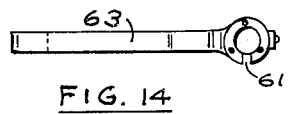

In FIGS. 13 and 14 is shown a sleeve built on the same general principles as that in FIG. 12, except that in lieu of spurs 62, the device here has elastic arms 63. The sleeve 60 is slipped over rod 50 and hooked by groove 61 against pin 57. Arms 63 are then in a horizontal position, and by proper manipulation of the lever they can be brought in against the tire until curved ends 64 slip over curved ends 23 of spring 22. Moving the lever now away from the tire will compel regions 24 of the prongs to spread apart, whereupon the clamp slips off the tire without much difficulty.

It will be understood that numerous variations in the details of this invention may be made within the skill of those engaged in this art.

In the claims below the term "width" when referring to a tire shall be construed as referring to the dimension of the tire crosswise of its equatorial plane.

I claim as my invention:

1. An antiskid appliance for rubber-tired vehicles, comprising an essentially U-shaped clamp having a ground contacting bottom portion which comprises a grooved, vulcanized rubber pad having an outwardly concave steel band threaded through it lengthwise, said steel band being bent beyond the ends of said pad and extending rearwards to form two tire gripping prongs, each prong comprising a plurality of discrete tines, some of which are shaped to grip the tire tight in its regions of receding width but not in the shoulder portions, while others are shaped to grip the shoulder portions.

2. An antiskid device for rubber-tired vehicles, comprising an essentially U-shaped clamp fashioned to be affixed onto a tire with the bottom of the U contacting the tread of the tire while its legs are in gripping contact with the tire sidewalls, whereby the clamp is made to rotate with the tire, the bottom of said U-clamp comprising in combination a pad of traction-increasing elastomeric material and an elongated, elastic metal member disposed crosswise of the tread of the tire, in contact with said pad, and extending on both ends of the pad to form rearwardly extending portions making up the legs of said U, each of said rearwardly extending portions comprising a plurality of discrete tines, some of which are shaped to grip the tire in its regions of receding width but not in the shoulder portions while others are shaped to grip the shoulder portions, and said pad-and-metal combination being shaped to exert greater upward pressure at the edges of the ground contacting area than at the middle thereof when the rotation of the tire brings said pad in contact with the ground, whereby to increase the pressure against the tire sidewalls of those metal tines which grip the tire in its regions of receding width.

References Cited by the Examiner

UNITED STATES PATENTS

| | | | |
|---|---|---|---|
| 2,330,839 | 10/43 | O'Brien | 152—225 |
| 2,625,193 | 1/53 | La Rocca | 152—225 |
| 2,867,259 | 1/59 | Barron | 152—225 |

ARTHUR L. LA POINT, *Primary Examiner.*